INVENTOR
ROBERT J. ZELINSKI
CHARLES W. IRWIN
BY
Andrus & Starke
Attorneys

United States Patent Office 3,458,739
Patented July 29, 1969

3,458,739
AIR COOLED MOTOR
Robert J. Zelinski, Vandalia, and Charles W. Irwin, Dayton, Ohio, assignors to A. O. Smith Corporation, Milwaukee, Wis., a corporation of New York
Filed Sept. 13, 1967, Ser. No. 667,445
Int. Cl. H02k 9/06
U.S. Cl. 310—62   13 Claims

ABSTRACT OF THE DISCLOSURE

A vertical mounted condenser motor has a closed bottom and open top. A closed control chamber is provided in the lower end and houses a solid state speed control with a heat sensitive rectifier potted in a cavity in the lower end cap. A main fan is connected to top of the shaft to draw air over the motor and the condenser. An auxiliary fan is secured to the shaft at the open top and draws air through a plurality of inlet openings in the lower side portion of the motor.

---

This invention relates to an air cooled dynamo-electric machine and particularly to a motor for an air cooled condenser wherein the motor is mounted as a part of a condenser unit to draw air in and through the condenser.

Generally, motors and similar dynamoelectric machines are provided with cooling systems for moving air over the exterior and/or interior surfaces to cool the motor under operating conditions and the like. In recent developments of motors, the energizing and control circuits have employed solid state control devices such as solid state diodes, silicon controlled rectifiers, transistors and the like. Such circuitry may conveniently be formed as an integrated part of the motor proper. Solid state devices are generally quite temperature sensitive and cooling air is preferably passed over or in adjacent relationship to the components to provide cooling. For example, the United States Patent 3,353,078 issued to John T. Maynard entitled, Dynoelectric Machine and Control Therefor, discloses a split capacitor type motor having an integrated control circuit mounted within the motor for cooling purposes.

In certain motor applications, cooling air must be passed through the motor. Generally, the opposite ends of the motor include openings to permit air passage. This may present problems if the motor is mounted with a vertical axis of rotation and is operated in an atmosphere containing foreign matter which can enter the motor through the openings.

For example, an air cooled condenser in a refrigeration system may employ a fan motor mounted in a vertical position with a fan unit secured to the upper end thereof to pass air upwardly through a condenser. This presents several problems in connection with provision of proper air movement through the motor while preventing introduction of moisture and other foreign matter into the motor with the corresponding adverse effects.

The present invention is particularly directed to an air cooled motor which may be disposed in a vertical position and in particular to an improved means for mounting of the solid state controls within the motor and to an improved means for providing cooling air movement over and through the motor proper.

Generally, in accordance with the present invention, the motor includes the enclosing housing having air openings to pass air through the motor. The motor shaft extends through one end frame member or cap which includes the air openings. A first fan assembly is secured to the shaft in spaced relation to said end cap to pass air over the outer surfaces of the motor and a special auxiliary fan assembly is secured to the shaft between the end cap and the first fan assembly. The auxiliary fan assembly includes an imperforate blade support which covers the end of the motor to prevent entrance of foreign matter through the openings in the end cap while providing positive movement of air through the motor.

In accordance with a particular novel aspect of the present invention wherein means are provided to control the motor operation, the motor is formed with the one end essentially closed and provided with an end cap defining a motor control chamber. The control components are generally disposed within the control chamber on a suitable insulating board; for example, in a manner generally similar to that disclosed in the previously referred to application. Additionally, in accordance with the present invention, a solid state triggered device such as a unit which is manufactured and sold by the General Electric Company under the trademark "Triac" is provided and secured to the outer end cap which is preferably provided with an outwardly cup-shaped portion within which the unit is secured. The depth of the cup-shaped cavity is slightly greater than the total depth of the "Triac" unit. The assembly of the "Triac" unit is located within the cup-shaped portion or cavity with all the connecting leads projecting outwardly into the control chamber. The cavity or recess is filled with a high temperature potting material or compound having not only good electrical insulating properties but good heat conducting properties. The potting compound physically supports the "Triac" unit and its heat sink in insulated relationship to the other components while providing relatively rapid dissipation of the heat.

In accordance with the present invention in combination with a condenser motor or the like having the internal motor speed control, the condenser motor is mounted in a vertical position with the shaft projecting upwardly from the upper end of the motor. The main fan assembly is connected to the extended end of the shaft to move air past the motor and through a condenser assembly or other similar device. As the lower end of the motor is enclosed by the control chamber only a minimal amount of air flow through the condenser would enter the motor for motor cooling. In accordance with the present invention, an auxiliary fan of a special construction is secured to the shaft inwardly of the main fan. The lower end of the stator frame is provided with a plurality of circumferentially distributed inlet openings and the upper end of the motor is provided with outlet openings. The rotor proper is also desirably provided with axial passageways. The auxiliary fans draws air inwardly through the inlet openings and the axial passageway of the rotor to cause additional cooling of the control chamber and further cooling of the motor proper. The auxiliary fan is constructed with a flat plate-like support overlying the complete upper end of the motor and with the vanes projecting inwardly or downwardly over the exterior or the top end cover of the motor. The support plate forms a cover preventing entrance of moisture from the condenser into the motor while maintaining excellent cooling properties. Even at lower speeds where most of the motor losses appear in the rotor, the cooling system of the present invention provides effective cooling of the motor.

The drawings furnished herewith illustrate a preferred construction of the present invention in which the above advantages and features are clearly dislosed as well as others which will be clear from the following description.

Figure 1:
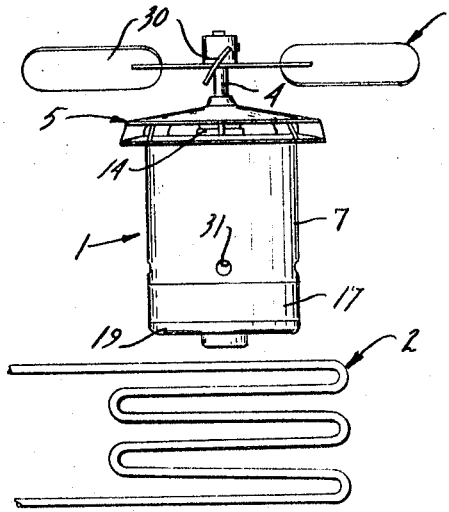
FIG. 1 is a side elevational view showing a condenser motor constructed in accordance with the present invention.
Figure 2:
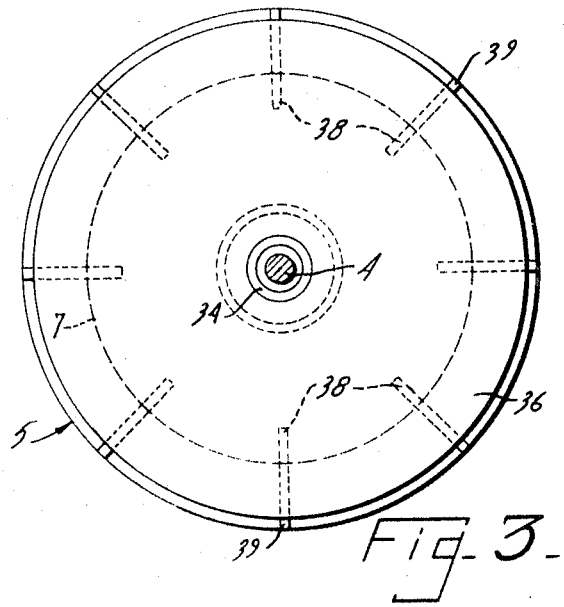
FIG. 2 is an enlarged vertical section through the motor shown in FIG. 1.
Figure 3:
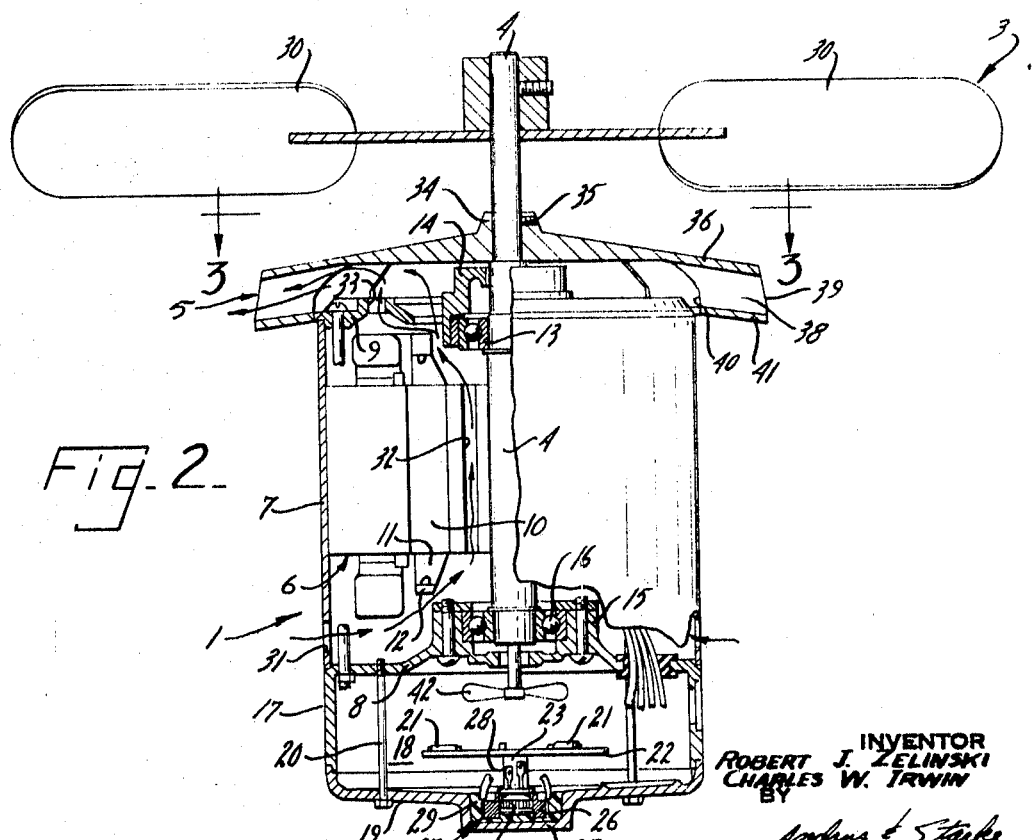
FIG. 3 is an end view taken generally on line 3—3 of FIG. 1 with parts broken away and sectioned to more clearly illustrate the fan construction of the present invention.

Referring to the drawings and particularly to FIG. 1, an air-cooled condenser motor 1 is shown mounted above a condenser 2 to draw air upwardly through the condenser for continuously cooling thereof. The motor 1 is an alternating current unit having its axis of rotation extending in a vertical direction with a main fan assembly or unit 3 connected to the upper end of the motor shaft 4 for establishing the required cooling air for the condenser. An auxiliary fan assembly or unit 5 is connected to the shaft 4 beneath unit 3 and serves to pass air through motor 1, as subsequently described.

The motor generally includes an annular stator assembly 6 centrally secured to an annular stator frame 7 which projects axially beyond the opposite ends of assembly 6. A lower end frame 8 seals the lower end of frame 7 and an upper end frame 9 seals the upper end of frame 7. The end frames are secured to the frame 7 by the usual through bolts or the like. A rotor 10 is fixed to the shaft 4 and aligned with the stator assembly 6. The illustrated rotor 10 is of a well-known squirrel cage variety in which the conductors 11 are cast within suitable slots within the rotor and interconnected by integrally cast end rings 12.

An upper bearing unit 13 is secured within a central hub portion 14 of the upper end frame 9. The shaft projects through the hub and is rotatably supported by the bearing unit. The lower end frame 8 includes a central bearing hub 15 within which a suitable bearing 16 is secured to rotatably support the lowermost end of motor shaft 4.

The end frame 8 includes an annular outwardly axially projecting wall 17 defining a control chamber 18. The outermost end of the control chamber 18 is sealed by a shallow cup-shaped end cover 19.

In the illustrated embodiment of the invention, the end cover 19 and the wall 17 are provided with offset interlocking lips or edges. The end cover 19 and wall 17 are secured to the lower end frame 8 in any suitable manner as by bolts 20.

The motor is driven at a variable speed by controlling the field excitation of the motor; for example, as shown in the previously referred to patent application. The control circuit as shown therein is a solid state type control. In accordance with the present invention, the solid state control components 21 are generally mounted on an insulating board 22 and centrally disposed within the control chamber 18. The mounting board 22 is secured to a pair of spaced inward protrusions or mounting posts 23 integrally cast on the end cover 19 and terminating outwardly of the edge of the cover. The control circuit, not shown, further includes a solid state switching device such as a "Triac" 24 or the like which is mounted within a cavity formed by an outwardly projecting cup-shaped portion 25 in the center of the end cover 19. The "Triac" 24 is a small pellet or cylindrical type unit wedged or otherwise firmly secured within an encircling heat sink 26 to form a small subassembly 27. The connecting leads 28 for the "Triac" 24 and sink 26 project from one end in accordance with the well known standard construction. The depth of the sub assembly is somewhat less than the depth of the cup-shaped cavity in the end cover 19. The "Triac" and heat sink subassembly 27 is centrally secured within the cavity and held in spaced relation to the cavity walls by a suitable potting compound or material 29. The "Triac" and heat sink subassembly 27 is disposed within the cup-shaped cavity with the leads 28 projecting outwardly toward the mounting board 22 for connection to components 21.

The potting compound may be of a suitable plastic which firmly supports the assembly within the cavity and which has excellent electrical insulating properties to prevent grounding of the subassembly to the frame and further has very good heat dissipating or transmitting characteristics to prevent overheating of the subassembly. The "Triac" and heat sink subassembly 27 is maintained at a relatively low operating temperature as a result of the air passing over the exterior of the motor.

Such air movement is established by the main fan unit 3 which is secured to the outer upper end of the shaft 4 in any suitable manner. The fan blades 30 are disposed generally exteriorly of the motor 1 and draw air upwardly through the condenser 2 and past the motor 1.

Because the lower end of motor 1 is closed very little of the air flowing through the condenser enters the motor 1 for effective motor cooling.

The auxiliary or secondary fan unit 5 is secured to the shaft 4 immediately adjacent the end cover 9 for passing air through motor 1. The annular stator frame 7 is provided with a plurality of circumferentially distributed vent or inlet holes or openings 31 immediately adjacent the lower end frame 8. The rotor 10 is provided with a plurality of circumferentially distributed axial passageways 32 inwardly of the conductors 11. The upper end frame 9 of the motor 1 includes a plurality of circumferentially distributed openings 33 to permit passage of air upwardly through the motor as hereinafter described.

The auxiliary fan unit 5 includes a hub 34 releasably secured to the shaft 4 in any suitable manner shown as a set screw 35. An imperforate blade support shown as a disc-like member 36 is integrally cast with or otherwise secured to the hub 34 and extends outwardly over the end frame 9 to provide a protective cover or canopy.

A plurality of similar fan blades 38 are cast with, or separately formed and then secured to the outer peripheral portion of the disc-like member 36 between the member 36 and the end frame 9. The outer edge 39 of a blade 38 slants outwardly slightly from the outer edge of the member 36. The radially inner edge 40 of blade 38 extends from disc-like member 36 inwardly of the outer circumference of the motor 1 and projects outwardly to just beyond the plane of the outer surface of the motor 1 and then extends axially generally parallel to such plane. The inner edge 40 terminates generally in alignment with the outer periphery of the end cover 9. A ring-shaped baffle 41 is secured to the outer ends of the several fan blades 38. This baffle 41 may also be separately formed and secured to the frame 7 adjacent the outer ends of blades 38.

Thus, the components of auxiliary fan assembly or unit 5 may be formed as an integral cast unit of a suitable metal or plastic or formed of separate members interconnected in any desired manner.

The auxiliary fan unit 5 rotates simultaneously with the main fan unit 3. Rotation of the unit 5 draws a portion of the air passing over the motor 1 through the vent holes 31, the axial passageways 32 as well as other passageways which might be provided within the motor and the circumferentially distributed openings 33 in the upper end frame to establish and maintain a flow of cooling air through the motor 1 as well as over the motor 1. Further, the continuous support disc 36 constitutes and serves as a drip cover overlying the upper end frame 9 to prevent water or other foreign matter from dropping into the motor through the upper end frame 9.

In the illustrated embodiment of the invention, a small auxiliary fan 42 is provided within the control chamber 18. The end frame 8 is provided with a central opening through which a reduced extension of shaft 4 projects into chamber 18. Fan 42 is secured to the end of the shaft extension.

It has been found that the dual fan arrangement provides a highly satisfactory cooling means for air-cooled motors and particularly in combination with the separately housed control system having the solid state device secured within the lower end cover by a suitable potting material.

Various modes of carrying out the invention are contemplated as being within the scope of the following claims particularly pointing out and distinctly claiming the subject matter which is regarded as the invention.

We claim:

1. An air cooled dynamoelectric machine having an exterior frame and a rotating shaft, said frame being closed at a first end and open at the second end, comprising a first fan assembly secured to the shaft in outwardly spaced relation to the open end of the frame to pass air over the exterior of the frame, said exterior frame having openings in the side wall adjacent the closed end, and an auxiliary fan assembly secured to the shaft between the open end of the frame and the first fan assembly to draw air through the motor to cool the internal portions of the motor.

2. The dynamoelectric machine of claim 1 having a solid state switching device secured to the first end in heat exchange relation with the end frame.

3. The dynamoelectric machine of claim 1 wherein the closed end of the frame includes an end wall having a cavity on its inner surface, a solid state switching device is disposed within the cavity in spaced relation to the cavity walls, and a potting compound fills the cavity, said potting compound adhering to the cavity wall and the switching device to physically support and insulate the device and transfer heat from the device.

4. The dynamoelectric machine of claim 1 wherein the lower end of the exterior frame is closed by a control chamber having the air flow of the first fan assembly passing over the chamber, and a solid state control element secured in heat exchange relationship to the lowermost wall of said control chamber.

5. The dynamoelectric machine of claim 1 wherein an end cover is releasably secured to the frame to close the first end, said end cover having an outwardly projecting cup-shaped cavity located centrally of the end cover, a solid state switching unit disposed within said cavity in spaced relationship to the cavity walls, and a potting compound filling said cavity to the outer plane of the subassembly to physically support the subassembly, said compound having a high dielectric constant and good thermal conductivity.

6. The dynamolectric machine of claim 1 wherein the first fan assembly includes fan blades extended substantially outwardly of the frame and said fan blades of the auxiliary fan assembly are axially extending plate-like members secured to the outer portion of the support and located immediately radially outwardly of the frame and inwardly of the first fan assembly blades.

7. The dynamoelectric machine of claim 1 wherein the lower end of the exterior frame is closed by a bearing wall having a centrally located shaft bearing within which the lowermost end of the shaft is journaled, said bearing wall including a peripheral axially projecting edge wall and an end cover releasably secured to the outer end of the side wall to define a sealed control chamber, said end cover having an outwardly projecting cup-shaped cavity located centrally of the end cover, a solid state switching unit secured within a doughnut-shaped heat sink member, said switching unit and heat sink member forming a subassembly disposed within said cavity in spaced relation to the cavity walls and with the lead connections projecting outwardly of the cavity into the control chamber, a potting compound filling said cavity to the outer plane of the subassembly to physically support the subassembly, said compound having a high dielectric constant and good thermal conductivity, a control board disposed within the control chamber, and a control circuit means secured to said board and connected to the lead connections of said switching unit.

8. An air cooled dynamoelectric machine having an exterior frame and a rotating shaft and constructed to be mounted on a vertical axis of rotation with the shaft projecting from the upper end of the machine, comprising a first fan assembly secured to the upper end of the shaft in spaced relation to the upper end of the frame to pass air over the exterior of the frame, said exterior frame having openings in the lower portion and in the upper portion, and an auxiliary fan assembly secured to the shaft between the upper end of the exterior frame and the first fan assembly and including an imperforate blade support covering the upper end to cover the machine against foreign matter from above the auxiliary fan assembly and having fan blades secured to the support and located to draw air through the opening in the lower and upper portion of the frame to cool the internal portions of the motor.

9. The dynamoelectric machine of claim 8 having the lower end of the frame sealed.

10. The dynamoelectric machine of claim 8 wherein the first fan assembly includes fan blades extended substantially outwardly of the frame and said fan blades of the auxiliary fan assembly are axially extending plate-like members secured to the outer portion of the support and located immediately radially outwardly of the frame and inwardly of the first fan assembly blades.

11. The dynamoelectric machine of claim 8 wherein the lower end of the exterior frame includes a bearing wall closing the lower end of the frame and having a centrally located shaft bearing within which the lowermost end of the shaft is journaled, said bearing wall including a peripheral axially projecting edge wall, an end cover releasably secured to the outer end of the side wall, said end cover having an outwardly projecting cup-shaped cavity located centrally of the end cover, a solid state switching unit secured within an encircling heat sink member, said switching unit and heat sink member forming a subassembly disposed within said cavity in spaced relation to the cavity walls and with the lead connections projecting outwardly of the cavity, a potting compound filling said cavity to the outer plane of the subassembly to physically support the subassembly, said compound having a high dielectric constant and good thermal conductivity, a control board disposed within the control chamber, and a control circuit means secured to said board and connected to the lead connections of said switching unit.

12. An air cooled dynamoelectric machine having an exterior essentially closed frame and a rotating shaft, said frame having air openings adjacent the opposite ends of the frame including openings in one end, comprising a first fan assembly secured to the shaft in spaced relation to the open end of the frame to pass air over the exterior of the frame, and an auxiliary fan assembly secured to the shaft between the open end of the frame and the first fan assembly to draw air through the motor to cool the internal portions of the motor, said auxiliary fan assembly including a continuous imperforate blade support covering the corresponding end of the motor to prevent entrance of foreign matter.

13. The air cooled dynamoelectric machine of claim 12 wherein said end of frame opposite said open end is closed by a control chamber, said control chamber having said rotating shaft terminating therein, a solid state control assembly mounted within said chamber, and a fan means secured to the shaft within the control chamber.

References Cited

UNITED STATES PATENTS

| | | | |
|---|---|---|---|
| 2,829,286 | 4/1958 | Britz | 310—53 |
| 2,936,774 | 5/1960 | Holley | 310—62 |

FOREIGN PATENTS

| | | |
|---|---|---|
| 219,128 | 6/1961 | Austria. |

WARREN E. RAY, Primary Examiner

R. SKUDY, Assistant Examiner